US007536262B2

(12) United States Patent
Hornbostel et al.

(10) Patent No.: US 7,536,262 B2
(45) Date of Patent: May 19, 2009

(54) KALMAN FILTER APPROACH TO PROCESSING ELECTROMAGNETIC DATA

(75) Inventors: Scott Hornbostel, Houston, TX (US); Xinyou Lu, Missouri City, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 413 days.

(21) Appl. No.: 11/597,594

(22) PCT Filed: Apr. 26, 2005

(86) PCT No.: PCT/US2005/014143

§ 371 (c)(1), (2), (4) Date: Nov. 21, 2006

(87) PCT Pub. No.: WO2005/117540

PCT Pub. Date: Dec. 15, 2005

(65) Prior Publication Data

US 2007/0239403 A1  Oct. 11, 2007

Related U.S. Application Data

(60) Provisional application No. 60/576,201, filed on Jun. 1, 2004.

(51) Int. Cl.
*G01V 3/38* (2006.01)
*G01V 1/50* (2006.01)
*G01V 1/24* (2006.01)
*G01V 1/28* (2006.01)
*G01V 1/48* (2006.01)
*G06F 19/00* (2006.01)
*G06F 17/40* (2006.01)

(52) U.S. Cl. .......... 702/17; 73/152.01; 73/152.02; 166/248; 175/41; 175/50; 324/333; 324/334; 324/344; 702/6; 702/7; 702/11; 702/14; 702/187; 702/190; 702/194

(58) Field of Classification Search ............... 73/152.01, 73/152.02, 152.05, 866; 166/244.1, 248, 166/250.01, 250.02; 175/40, 41, 50; 324/323, 324/333, 334, 344; 702/1, 2, 6, 7, 8, 11, 702/14, 17, 127, 187, 189, 190, 194, 195, 702/196, 197

See application file for complete search history.

(56) References Cited

U.S. PATENT DOCUMENTS

| | | | | | |
|---|---|---|---|---|---|
| 3,230,541 | A | * | 1/1966 | Roark et al. | 346/33 C |
| 3,242,326 | A | * | 3/1966 | Cox | 702/14 |
| 3,281,776 | A | * | 10/1966 | Ruehle | 367/45 |
| 4,882,713 | A | * | 11/1989 | Hughes | 367/47 |
| 4,905,204 | A | * | 2/1990 | Hughes | 367/62 |

(Continued)

OTHER PUBLICATIONS

Brown (1983) "*Introduction to Random Signal Analysis and Kalman Filtering*," John Wiley & Sons, N.Y.

(Continued)

*Primary Examiner*—Edward R Cosimano

(57) ABSTRACT

A method for tracking a sinusoidal electromagnetic signal in noisy data using a Kalman filter or other tracking algorithm. The method is useful for controlled source electromagnetic surveying where longer source-receiver offsets can cause the source signal to decay significantly and be difficult to retrieve from magnetotelluric or other electromagnetic background.

12 Claims, 6 Drawing Sheets

U.S. PATENT DOCUMENTS

| | | | |
|---|---|---|---|
| 5,181,171 A * | 1/1993 | McCormack et al. | 702/14 |
| 5,742,740 A * | 4/1998 | McCormack et al. | 706/14 |
| 6,603,313 B1 | 8/2003 | Srnka | 324/354 |
| 6,914,433 B2 | 7/2005 | Wright et al. | 324/336 |
| 6,944,546 B2 | 9/2005 | Xiao et al. | 702/6 |

OTHER PUBLICATIONS

Constable, S. et al (1996) "Marine Controlled-Source Electromagnetic Sounding 2. The Pegasus Experiment," *Journal of Geophysical Research*, v. 101, pp. 5519-5530.

Kalman (1960) "*Trans. Of the ASME—J. Of Basic Engr.*," pp. 35-45.

La Scala, B.F. et al (1996) "Design of an Extended Kalman Filter Frequency Tracker" *IEEE Transactions On Signal Processing IEEE USA*, vol. 44.3, pp. 739-742.

Lagunas, M. A. et al (1992) "High Order Learning In Temporal Reference Array Beamforming," *Signal Processing VI. Theories and Applications*. Elsevier Science Pub. B.V., pp. 1085-1088. (XP000348565 ISBN:0-444-89587).

Rauch (1963) "Solutions to the linear smoothing problem," *IEEE Trans. On Auto. Control*, AC-8, p. 371.

Rauch et al (1965) "Maximum likelihood estimates of linear dynamic systems," *AIAA J.* 3, p. 1445.

Szelag (1982) "A short term forecasting algorithm for truck demand servicing," *The Bell System Technical Journal*, 61, pp. 67-69.

Zhoubir, A. et al (2002) "Signal Processing Techniques For Landmine Detection Using Impulse Ground Penetrating Radar," *IEEE Sensors Journal*, v. 2.1, pp. 41-51, (XP001116272 ISSN: 1530-437X/02).

EP (2004) Standard Search Report No. RS111597 dated Nov. 23, 2004, 1 page.

PCT International Search & Written Opinion—Feb. 10, 2006, 7 pgs.

* cited by examiner

_US 7,536,262 B2_

KALMAN FILTER APPROACH TO PROCESSING ELECTROMAGNETIC DATA

This application is the National Stage of International Application No. PCT/US2005/014143, filed 26 Apr. 2005, which claims the benefit of expired U.S. Provisional Patent Application No. 60/576,201 filed on Jun. 1, 2004.

FIELD OF THE INVENTION

This invention relates generally to the field of geophysical prospecting and, more particularly, to electromagnetic methods used to explore for hydrocarbons. Specifically, the invention is a method for tracking electromagnetic source signals used in controlled source electromagnetic prospecting so that the signal can be recovered from noise.

BACKGROUND OF THE INVENTION

Controlled-source electromagnetic ("CSEM") geophysical surveys use active (man-made) sources to generate electromagnetic fields to excite the earth, and deploy receiver instruments on the earth's surface, the seafloor, or inside boreholes to measure the resulting electric and magnetic fields, i.e., the earth's response to the source excitation. FIG. 1 illustrates the basic elements of an offshore CSEM survey. A vessel tows a submerged CSEM transmitter 11 over an area of sub-sea floor 13. The electric and magnetic fields measured by receivers 12 are then analyzed to determine the electrical resistivity of the earth structures (subsurface formations) beneath the surface or seafloor. This technology has been applied for onshore mineral exploration, oceanic tectonic studies, and offshore petroleum and mineral resource exploration.

Active electromagnetic source signals can be treated as a sum of sinusoidal signals (e.g., a square-wave signal made up of a fundamental frequency with odd harmonics). An example of such a source is the horizontal electric dipole used in much CSEM work. As the offset, i.e., the distance between such a dipole source 11 and the receivers 12 increases, the sinusoidal signal can decay significantly. Moreover, the far offsets are often critical for determining deep resistivity structures of interest. As a result, a need exists to obtain the best possible signal-to-noise ratio for this sinusoidal signal.

Typical processing methods to improve signal noise for this EM data involve breaking the data into time windows over which Fourier analysis or a similar method is used to calculate the amplitude and phase of selected frequency component(s). See, for example, Constable and Cox, "Marine controlled-source electromagnetic sounding 2. The PEGASUS Experiment," _Journal of Geophysical Research_ 101, 5519-5530 (1996). These windows cannot be too large because signal amplitude and relative phase may change substantially within the analysis window. Small windows, however, allow only minimal signal-to-noise ratio improvement. Current methods require a compromise between these two extremes.

Another problem with existing methods is that they don't take advantage of signal and noise correlations. Low-frequency magnetotelluric ("MT") noises, in particular, are a significant problem for active source marine EM imaging because they can masquerade as signal. (MT noise is electromagnetic emissions from natural, not active, sources.) Correlations between different detectors could be used to help separate active-source signals from these noises. Other signal and noise correlations (e.g., signal correlations on the two horizontal components) are not optimally used in current approaches.

The Kalman filter algorithm has its origins in navigation positioning problems and is particularly suited to the class of tracking problems (Kalman, 1960). Originally published by Kalman in _Trans. of the ASME—J. of Basic Engr._, 35-45 (1960), much has been published since on modifications and applications of the basic Kalman filter as summarized, for example, by Brown in _Introduction to Random Signal Analysis and Kalman Filtering_, John Wiley & Sons, N.Y. (1983). A few of these modifications are of significance to some embodiments of the current invention.

The standard Kalman filter runs in one direction and filters data in this direction (or time) sequence. Therefore only previous data influences the filter result. An important modification due to Rauch, et al., gives an optimal treatment that uses the entire time record: Rauch, "Solutions to the linear smoothing problem," _IEEE Trans. On Auto. Control_, AC-8, 371 (1963); and Rauch, et al., "Maximum likelihood estimates of linear dynamic systems," _AIAA J._ 3, 1445 (1965). Szelag disclosed another algorithmic modification that allows the filter to track sinusoidal signals of a known frequency; see "A short term forecasting algorithm for trunk demand servicing," _The Bell System Technical Journal_ 61, 67-96 (1982). This was developed to track annual cycles in telephone trunk load values.

FIG. 2 is a flow chart illustrating the Kalman algorithm. Reference may be had to Brown's treatise, page 200, for more details.

La Scala, et al., disclose use of a known extended Kalman filter for tracking a time-varying frequency. ("Design of an extended Kalman filter frequency tracker,"_IEEE Transactions on Signal Processing_ 44, No. 3, 739-742 (Mar., 1996)) The formulation assumes that the signal remains constant in amplitude. The particular Kalman algorithm used is therefore aimed at tracking a signal of unknown frequency where the frequency may undergo considerable change. Lagunas, et al., disclose an extended Kalman filter to track complex sinusoids in the presence of noise and frequency changes, such as Doppler shifts. ("High Order Learning in Termporal Reference Array Beamforming," _Signal Proc. VI, Theories and Applications_, Elsevier Sci. Pub. B.V., pp. 1085-1088 (1992)) Like the La Scala method, Lagunas's algorithm is designed to track sinusoids of unknown frequency. Both methods will therefore be sub-optimal if applied to track a signal with constant or near constant frequency. Lagunas's method is able to also track amplitude changes, provided the changes are relatively small. Neither invention is aimed at processing electromagnetic survey data obtained using an electromagnetic source transmitting known waveforms at a known frequency. There is a need for a method for tracking large amplitude variations and small phase changes about a known sinusoid, using large windows, or even all, of the electromagnetic data. The present invention satisfies this need.

SUMMARY OF THE INVENTION

In one embodiment, the invention is a method for tracking amplitude variations and phase changes of a transmitted periodic electromagnetic signal in noisy data detected over time by at least one receiver, said signal being transmitted at a known frequency, said method comprising the steps of: (a) selecting a tracking algorithm for tracking a signal of known frequency; (b) estimating initial values for the detected signal and at least one related parameter; (c) partitioning the detection time into intervals within each of which the detected signal and the at least one related parameter are assumed not to vary and assigning the estimated initial values to the first time interval; (d) estimating projection of the initial signal and each related parameter one interval ahead in time; (e) revising the initial estimates of step (d) using the data and the tracking algorithm; and (f) repeating steps (d)-(e) until all data are processed.

In some embodiments of the invention, the tracking algorithm is a Kalman algorithm, involving a state vector specified by a state equation and a measurement equation. In some of those embodiments, the state vector has two components, the signal's amplitude and the quadrature signal. In other embodiments, particularly useful for situations where the signal undergoes large amounts of attenuation, the state vector has two additional components that can be used to more easily track the signal: the rate of change of the signal envelope amplitude and the rate of change of the signal's relative phase.

BRIEF DESCRIPTION OF THE DRAWINGS

The present invention and its advantages will be better understood by referring to the following detailed description and the attached drawings in which.

Figure 1:
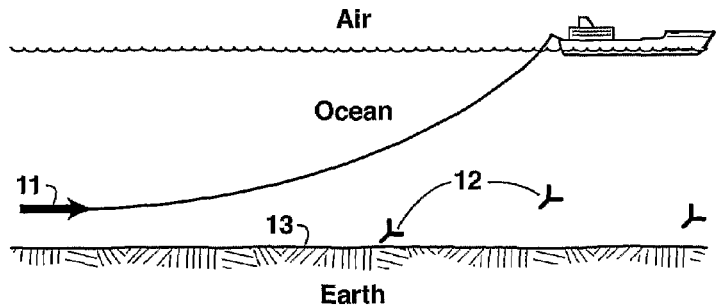
FIG. 1 illustrates the field layout for a typical controlled source electromagnetic survey.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is a method of using a tracking filter such as the Kalman algorithm to track sinusoidal signal and to recover the signal from electromagnetic noise. The Kalman filter approach disclosed herein addresses the problems with existing approaches discussed previously. To begin with, a large portion of the data record can be used to obtain an estimate at each instant. This is important because electromagnetic data can be highly correlated over long time periods because of the slow rate of phase change relative to a reference sine wave. In other words, information at a particular time gives information about the signal much later. Fourier analysis on isolated time windows, on the other hand, does not use any information outside the current window. In particular, the estimated amplitudes and phases may be discontinuous between windows. The Kalman method can also incorporate signal and noise characteristics such as: noise correlations between distant detectors (or different components on the same detector), signal correlations between components, time-varying signal and noise amplitude changes, and predictable effects of geology on the data.

In order to use the Kalman filter, the process must be expressed via two linear equations: the state equation and the measurement equation. In cases that fit this assumption, the Kalman algorithm gives the least-squares optimal signal estimate with its associated error covariance. The linear assumption will be valid for most applications. Examples where it might fail include measurement noise that is not additive, e.g., some kinds of signal clipping or distortion or multiplicative noise. Similarly, the state equation might fail the linearity assumption if, for example, the signal is totally unpredictable from one sample to the next or if the system is nearly unstable where the size of the signal influences the transition matrix. Situations that are mildly nonlinear can still be modeled using expansions or other approximations as is done below.

The required state equation contains a state vector $x_k$ that can be set up in several ways for electromagnetic data processing. At a minimum, $x_k$ will contain two components. These are the signal (e.g., horizontal electric field at a particular location) and its corresponding quadrature signal. The quadrature is the signal after a 90° phase shift. For sinusoid signals, the quadrature is proportional to the derivative of the signal. Two components are required since a sinusoid is the solution of a second-order differential equation. Additional component pairs would be needed for each signal to be estimated at each detector location. Additional derivatives can also be modeled, if desired, for each estimated signal. The additional derivatives are useful since updates to a derivative give a smoother correction to the signal estimate.

The Kalman filter requires specification of noise covariance and signal-drive covariance matrices. The noise covariance entries would be used, for example, to indicate noise level and correlations due to MT noise. The signal-drive covariance entries indicate the required adjustment rate of the filter and any signal correlation between components.

After the filter parameters are specified, the data can be preprocessed before beginning the filter algorithm. To begin with, the data can be scaled such that the expected signal portion of the data has relatively flat amplitude. In other words, the far offsets are scaled up using a rough prediction of the signal decay rate with offset. The filter algorithm is only required to track changes from this expected decay rate, which is more manageable than tracking the rapid amplitude decay with offset. As these data are scaled up to balance the signal, the random noise will be scaled up as well. This can be specified in the noise covariance matrix so that it is built into the algorithm that the far offset data have more noise.

In other embodiments of the inventive method, large changes in amplitude are dealt with by modeling amplitude decay rates instead of the amplitudes themselves. The decay (or rise) rates may be similar in amplitude even when the signal itself varies over several orders of magnitude.

Noise bursts or missing data can also be identified so that the filter will carry a sinusoid through these zones without requiring data. Measurement noise may also be adjusted to meet the white-noise requirement. These adjustments would include balancing filters, DC cut methods, filters to remove harmonic noise (if not treated as a signal), and modeling of colored noise using separate state variable(s).

For a typical square-wave signal, there are odd harmonics in addition to the nominal fundamental frequency. These harmonics can be filtered out (using bandpass filters) and processed as separate signals or they can be modeled simultaneously with the fundamental. Simultaneous modeling would make sense if one expected the harmonic signal adjustments to be correlated with the fundamental signal adjustments.

After the model specification and preprocessing, the Kalman filter algorithm can be used to estimate the state vector components as a function of time and the associated estimation error bars. This optimal estimate can then be used in further electromagnetic interpretation by comparing with parametric models or by using it as an input to an inversion for resistivity structure as taught by U.S. Pat. No. 6,603,313 to Srnka.

Figure 3:
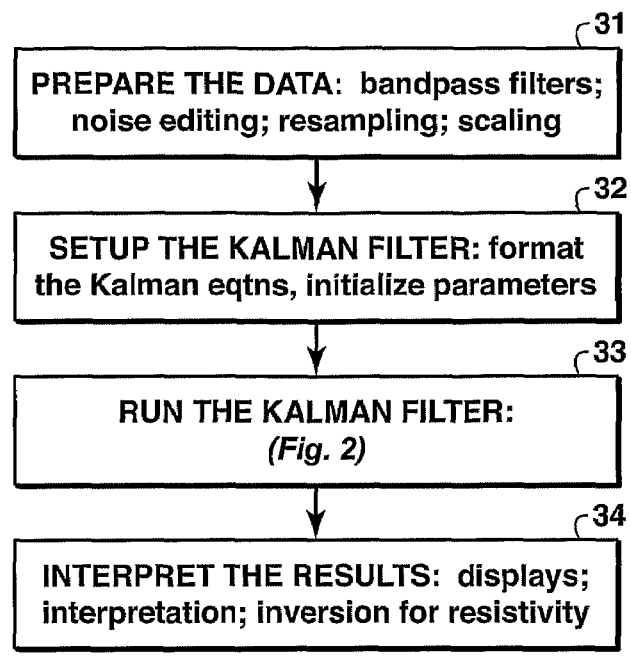
FIG. 3 is a flow chart showing the primary steps of one embodiment of the present inventive method using the Kalman filter as the tracking algorithm.

FIG. 3 shows the primary steps in one embodiment of the present invention. In this embodiment, the Kalman filter tracks the amplitude and phase changes of a received electromagnetic signal as a function of time. In the discussion to follow, the source and/or receiver are assumed to be moving and thus the source-to-receiver offset is changing as a function of time (as in FIG. 1 which depicts a moving source). The present invention can equally well be applied to stationary source and receivers, even though this is not an efficient way to conduct a CSEM survey.

Increases in source-to-receiver offset lead to substantial attenuation of the received signal. This is a potential problem for a tracking algorithm since the expected signal and corrections to it can vary over several orders of magnitude. In step 31 of FIG. 3, certain preliminary steps are performed to prepare the data measured by the receivers. One such step deals with the problem of the wide variation in the signal over the offset range used in the survey.

There are at least two ways to deal with this problem. In one approach, the data can be pre-scaled to compensate for typical amplitude fall-off rates with offset. Model results covering a range of expected conductivities should be consulted to determine this amplitude decay. After scaling, the filter task is simplified since one is only tracking variations from this baseline case and the size of the corrections is relatively constant.

In an alternate approach to the amplitude variation issue, state variables that correspond to amplitude and phase rates of change are added. These rates are easier to model since they are relatively constant in value for amplitudes that are decaying or rising exponentially. Other approaches to the amplitude problem may be imagined, including doing nothing about the amplitude variation, and all of them are intended to be within the scope of the present invention.

Also in step 31, the expected noise in the noise covariance matrix (discussed below) is preferably specified so that the algorithm can optimally use various qualities of data. For example, there may be random noise bursts (brief high-amplitude noises). These can be flagged in preprocessing so that the Kalman filter can carry the signal sinusoids through these zones without using the data.

Another desirable preprocessing step involves frequency filtering to balance the noise spectrum so that the assumption of white, additive noise is accurate. This may typically involve scaling down the very low frequency components (i.e., below the fundamental signal frequency) since ambient MT noise tends to be largest at these frequencies. In addition, the data can be low-pass filtered to remove higher-frequency noises and to allow resampling to a larger sample interval. The resampling improves the computational requirements of the algorithm.

A typical square-wave source signal will include the odd harmonics in addition to the nominal fundamental frequency. These harmonics can be filtered out (using bandpass or notch filters) and processed as separate signals or they can be modeled simultaneously with the fundamental. Simultaneous modeling may be preferred if one expects the harmonic signal adjustments to be correlated with the fundamental signal adjustments.

In summary of step 31, several data preparation techniques including those described above are used in preferred embodiments of the invention, but none of them are critical to the invention.

Figure 4:
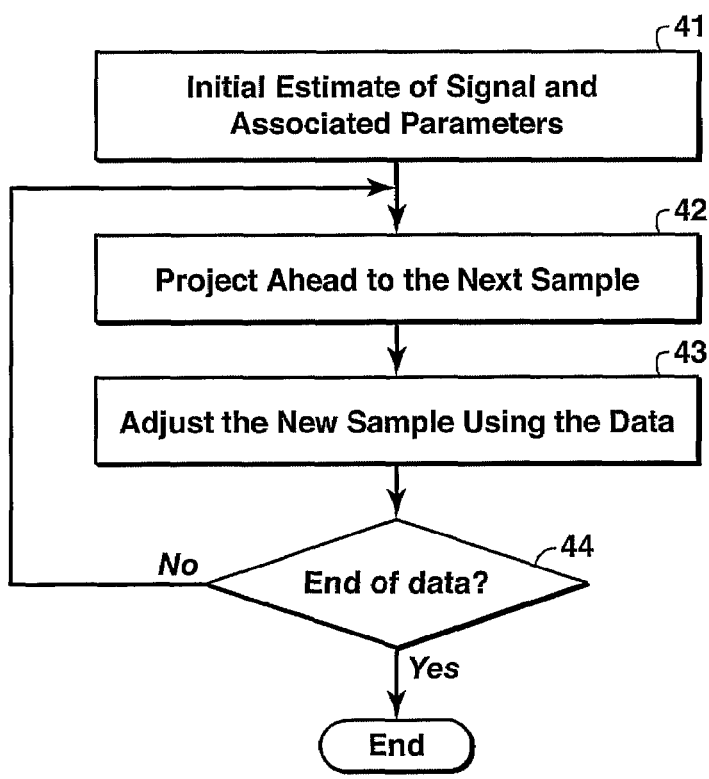
FIG. 4 is a flow chart of a more general embodiment of the present invention.

In step 32 of FIG. 3, the Kalman filter is set up for the application. In other embodiments of the invention, tracking algorithms other than the Kalman filter may be used. FIG. 4 shows the basic steps that are performed by such a more generic embodiment of the invention. In step 41, initial estimates of the signal and associated parameters are input to the algorithm. Typically, these initial time-sample values would include the signal of interest and its derivative. These initial values may be determined from near-offset data with high signal-to-noise ratio. Alternatively, an arbitrary initial guess may be used under the assumption that the algorithm will quickly converge on correct values. In step 42, these are projected ahead one sample using, for example, the rotation matrix discussed below in connection with the Kalman filter. In step 43, the new sample is adjusted based on the measured data and the specifics of the particular tracking algorithm. Step 44 concludes one cycle of the loop, which is repeated until the data is exhausted, i.e., until the signal has been projected ahead for the time period for which data were collected. This explanation is brief because further details that follow in connection with the Kalman filter will also apply to the generic algorithm.

The Kalman filter is the preferred solution for a state-space formulation of the electromagnetic signal-tracking problem. This formulation has two matrix equations: the "state" equation and the "measurement" equation. The state equation is $$x_{k+1} = \Phi_k x_k + w_k \quad (1)$$

where $x_k$ is the state vector at sample k, $\Phi_k$ is the state transition matrix, and $w_k$ is the state forcing function. The time scale is partitioned into finite intervals, and the measurement by each receiver is converted to a single number (called $z_k$ in the measurement equation below) for each time interval. Data sample k refers to the digitized output for the $k_{th}$ time interval, where k is an integer index denoting sequential time intervals. The forcing function is a white sequence that represents differences in the next state vector sample from what would otherwise be predicted by the transition matrix applied to the current sample. The transition matrix gives the predicted state vector at the next sample in the absence of any innovation (where $w_k$ is zero). Szelag's method was adapted to model an oscillating signal. Szelag used a two-element state vector with components for the oscillating signal and its quadrature signal (proportional to the derivative). Additional components can be used to model further derivatives of the signal in other embodiments of the invention. For the two-component case, the transition matrix that would produce an oscillation at frequency f is given by $$\Phi = \begin{bmatrix} \cos 2\pi fT & \sin 2\pi fT \\ -\sin 2\pi fT & \cos 2\pi fT \end{bmatrix} \quad (2)$$

where f is the signal frequency and T is the sample interval.

In a preferred embodiment of the invention, this simple formulation is expanded to instead track the amplitude and relative phase, since amplitude and relative phase will change gradually with time (offset) for the typical CSEM problem. This formulation uses a four-component state vector:

$$x = [x_s \, x_q \, A \, v]'; \quad (3)$$

where $x_s$ is the oscillating signal, $x_q$ is the quadrature signal, $\Delta A$ is the rate of change of the amplitude of the signal's envelope, and v is the rate of change of the signal's relative phase (i.e, the frequency shift). Since the amplitude and phase are not linearly related to the signal, a small-correction linearization of the state equation is implemented in one embodiment of the invention. Because variations in v and $\Delta A$ are expected be small, the linear assumption can be expected to be valid.

This linearization process is begun by estimating the values of $x_s$ and $x_q$ for sample (k+1) given the values at sample k for the four elements of the state vector. If there are no changes in amplitude or relative phase, the simple rotation matrix $\Phi$ of Equation (2) gives the projected values of $x_s$ and $x_q$ at the next sample:

$$x_s(k+1) = C \cdot x_s(k) + S \cdot x_q(k), \text{ and}$$

$$x_q(k+1) = -S \cdot x_s(k) + C \cdot x_q(k), \quad (4)$$

where $$C = \cos 2\pi fT, \text{ and}$$

$$S = \sin 2\pi fT. \quad (5)$$

In this embodiment of the invention, it is next assumed that the amplitude (signal envelope) increases at a rate of $\Delta A$ per second. In other words, the amplitude is multiplied by $(1+T \cdot \Delta A)$ in going to the next sample. This will occur to the signal envelope if both $x_s$ and $x_q$ are scaled by this factor:

$$x_s(k+1) = (1+T \cdot \Delta A) \cdot (C \cdot x_s(k) + S \cdot x_q(k)), \text{ and}$$

$$x_q(k+1) = (1+T \cdot \Delta A) \cdot (-S \cdot x_s(k) + C \cdot x_q(k)). \quad (6)$$

Next, consideration is given to a small relative phase change occurring at a rate of v radians/sec. This would cause a phase shift of vT when going to the next sample. This can be incorporated in the state equation by modifying the rotation sinusoids of equations (5) as follows:

$$\tilde{C} = \cos(2\pi fT + vT), \text{ and}$$

$$\tilde{S} = \sin(2\pi fT + vT). \quad (7)$$

In order to linearize this, use is made of the fact that vT<<1 to rewrite Eq. (7) as:

$$\tilde{C} = \cos 2\pi fT - vT \sin 2\pi fT, \text{ and}$$

$$\tilde{S} = \sin 2\pi fT + vT \cos 2\pi fT. \quad (8)$$

Combining equations (6) and (8) and keeping only first-order corrections yields the modified state equation:

$$x_{k+1} = \Phi_k x_k + w_k \quad (9)$$

where $$x = [x_s \quad x_q \quad \Delta A \quad v]', \quad (10)$$

$$\Phi = \begin{bmatrix} C & S & T(Cx_s + Sx_q) & T(-Sx_s + Cx_q) \\ -S & C & T(-Sx_s + Cx_q) & T(-Cx_s - Sx_q) \\ 0 & 0 & 1 & 0 \\ 0 & 0 & 0 & 1 \end{bmatrix}, \text{ and}$$

$$w = [0 \quad 0 \quad w_{\Delta A} \quad w_v]'.$$

It may be noted that changes from a constant amplitude sinusoid occur only through the $\Delta A$ and v elements since only at these elements is $w_k$ nonzero.

The covariance matrix associated with $w_k$ also must be specified. This is the means for controlling the adaptation rate of the filter—large covariance in $w_k$ means that larger changes in $\Delta A$ and v are required. When several data components are being modeled, signal correlations can be indicated by the off-diagonal elements in the state covariance matrix.

Other modifications to the state equation are also possible. At a minimum, $x_k$ will contain two components. These would be the signal (e.g., horizontal electric field at a particular location) and its corresponding quadrature signal (proportional to the derivative). Two additional components are used above to model amplitude and phase changes. Additional components would be needed for each signal to be estimated at each detector location. Additional derivatives can also be modeled, if desired, for each estimated signal. The additional derivatives may be useful since updates to a derivative give a smoother correction to the signal estimate.

The measurement equation for the Kalman filter in the above-described embodiment is given by $$z_k = H_k x_k + v_k \quad (11)$$

where $z_k$ is the measured data at sample k, H=[1 0 0 0]' is the measurement matrix that selects $x_s$ in the state vector, and $v_k$ is the measurement noise. The Kalman algorithm works well for noise that is white, or approximately white. If the noise is narrow band, e.g., sinusoidal, it can be modeled as a separate signal component and removed. The associated covariance matrix for $v_k$ gives the expected noise variance and correlation. The variance can be time-varying as it would be when working with scaled data (i.e., the noise would change exponentially for exponentially scaled data). Particularly noisy zones could also be specified with larger variances to minimize effects from noise bursts. The covariance matrix for $v_k$ is also the place where one would include information on correlated noise for the multiple-component case. This would be helpful, for example, when a distant detector contains information on MT noise.

In concluding the discussion of step 32 of FIG. 3, it can be seen that the Kalman filter approach disclosed herein addresses the problems noted above in the Background section. To begin with, a large effective data window can be used to obtain an estimate at each instant. This is important because electromagnetic data can be highly correlated over long time periods because of the slow rate of phase change relative to a reference sine wave. In other words, information at a particular time gives information about the signal much later. Fourier analysis on isolated time windows, on the other hand, does not use any information outside the current window. In particular, the estimated amplitudes and phases may be discontinuous between windows. The Kalman method can also incorporate signal and noise characteristics such as the following: noise correlations between distant detectors (or different components on the same detector), signal correlations between components, time-varying signal and noise amplitude changes, and predictable effects of geology on the data.

Figure 2:
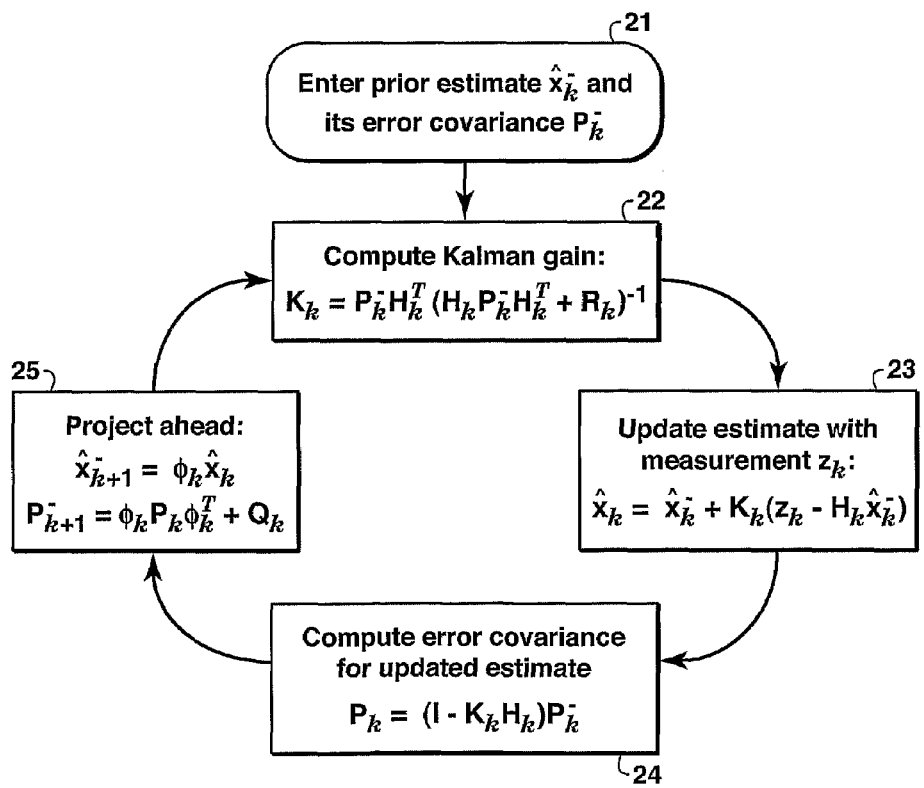
FIG. 2 is a flow chart showing the primary steps in the Kalman algorithm.

In step 33 of FIG. 3, the state equation, measurement equation, and associated covariance matrices are used to apply the Kalman filter in the manner indicated in FIG. 2. The Kalman filter normally runs in one direction. There are at least two ways to use information ahead of the current sample, i.e., data measured later in time. One option is to start part-way into the data and run backwards to get an initial estimate for the forward run. Another option is to employ the previously mentioned filter modifications of Rauch, et al., that include all the data ahead of the current sample. The Rauch approach has problems with the modified state equation (9) and (10) because of the data dependence of the transition matrix Φ.

The output from the Kalman filter will be the optimal (minimum mean-square error) state vector values and the associated signal error covariance matrices (error bars). A different tracking algorithm might use a different error minimization criterion.

FIG. 2 may be referred to again for a summary of how the Kalman filter works in the present inventive method. At step 21, initial values are estimated for the state vector and its covariance at some time sample. At step 22, the Kalman algorithm calculates the Kalman gain $K_k$ by evaluating the equation shown. The Kalman gain specifies how to modify the measured data in order to best merge it with the guess of the state vector. This merging of data is performed in step 23. At step 24, the error covariance for the new estimate is evaluated. Finally, in step 25, the new estimate is used to project ahead in time to the next sample, and the process is repeated. When each sample is processed, the least-squares solution for that sample is determined at that time by straightforward evaluation of the equations in the solution process. The state and measurement equations specify how the state of the system progresses and how the measurements relate to the state of the system. The covariance matrices $Q_k$ and $R_k$ in FIG. 2 correspond to the quantities $w_k$ and $r_k$ in the state and measurement equations. The values for $Q_k$ are typically determined by trial and error; they determine how quickly the filter reacts to changes in the data. The values of $R_k$ are determined from the noise variance (expected value of the square of the noise) and covariance (correlations between noise components, if necessary). In addition to the least-squares best solution for the state vector $x_k$, the Kalman algorithm also gives the related error covariance for this solution. Of course, the optimal nature of such a solution depends on the accurate specification of the state equation and the measurement equation, including the required covariance matrices for the state and measurement noises.

The optimal estimate of the state vector can be used in several ways during the interpretation phase (Step 34 of FIG. 3). For example, the signal estimate $x_s$ can be compared with parametric models to select among several modeled resistivity structures. Alternately, $x_s$ can be used as an input to an inversion for resistivity structure. ΔA and v could also be used instead of $x_s$ in either parametric studies or inversion.

Another interpretation approach is the use of ΔA and v in a "fast" 1D or 2D inversion. In one such embodiment, these state-vector elements are blocked to give piecewise exponential amplitude functions that would correspond with individual layers in a simplified geology.

EXAMPLE

Figure 5:
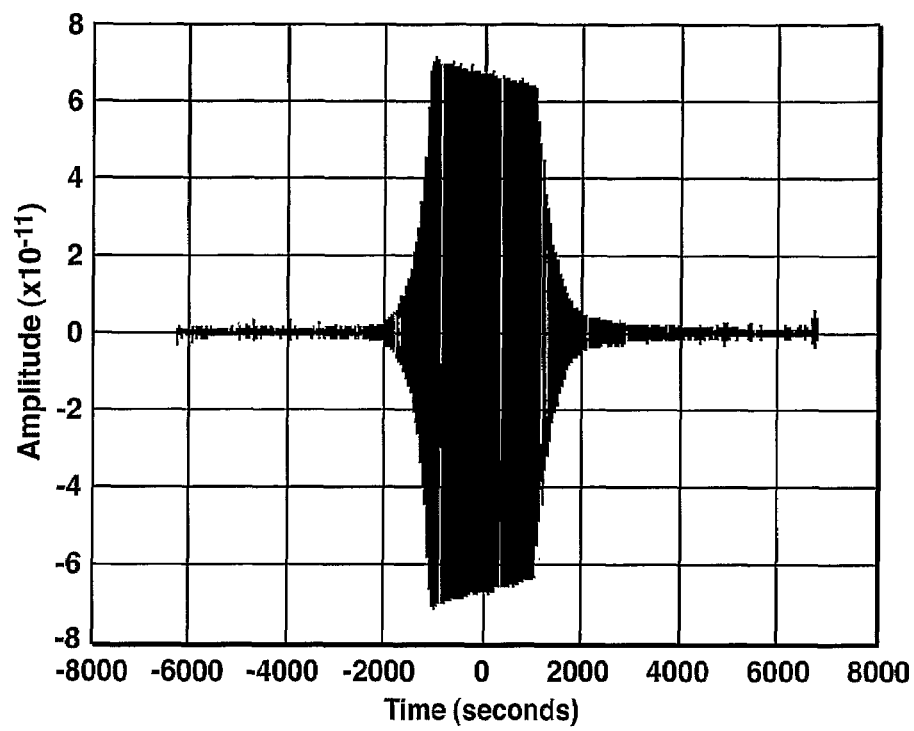
FIGS. 5-10 show the results of the present inventive method with Kalman algorithm applied to model data with 0.25 Hz signal frequency and additive random noise.
Figure 6:
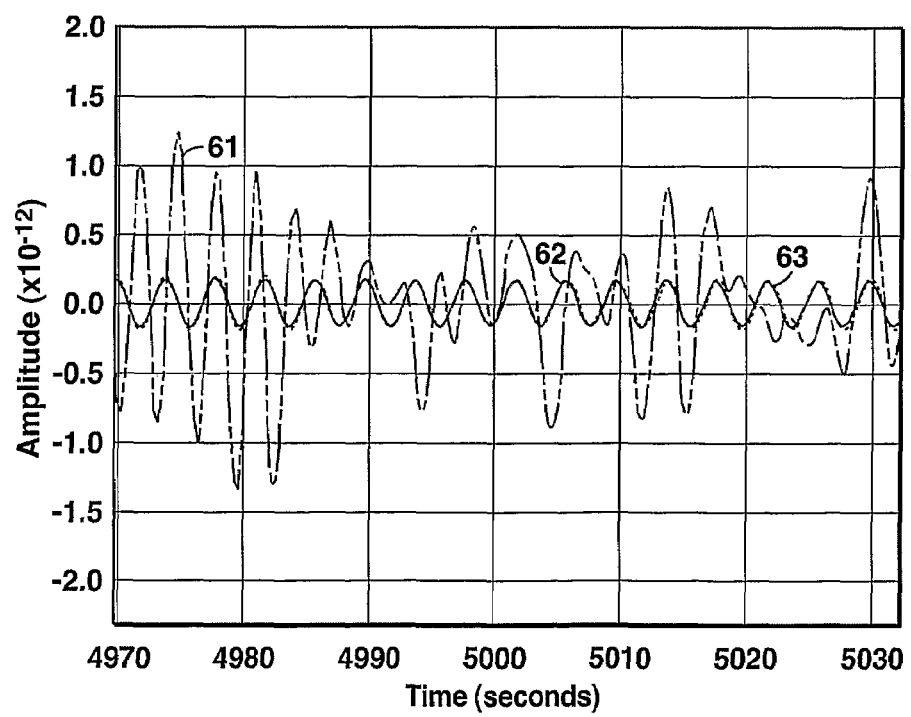

An example with modeled horizontal electric dipole data is illustrated in FIGS. 5 to 10. FIG. 5 shows the modeled data with additive random noise. The signal frequency is 0.25 Hz and decays roughly exponentially away from the zero-time position. The additive noise is taken from recorded ambient magnetotelluric noise. FIG. 6 illustrates a blow-up of this noisy input data (initial signal plus additive noise) 61 at around 5000 seconds. Plotted on the same figure is the noise-free signal portion 62 of the model data and an estimate 63 of the signal made by using the method of the present invention. The estimate 63 is nearly equal to the noise-free signal 62, and difficult to distinguish from it in FIG. 6. This close similarity is a measure of the present inventive method's success, because the method does not "know" the model signal. It is given only the noisy data as input but is able to recover the signal portion. The embodiment of the present invention that was used in this example employs the Kalman filter as the tracking algorithm, and otherwise is the one described above as preferred. The offset that corresponds to the portion represented in FIG. 6 is approximately 4000 m.

Figure 7:
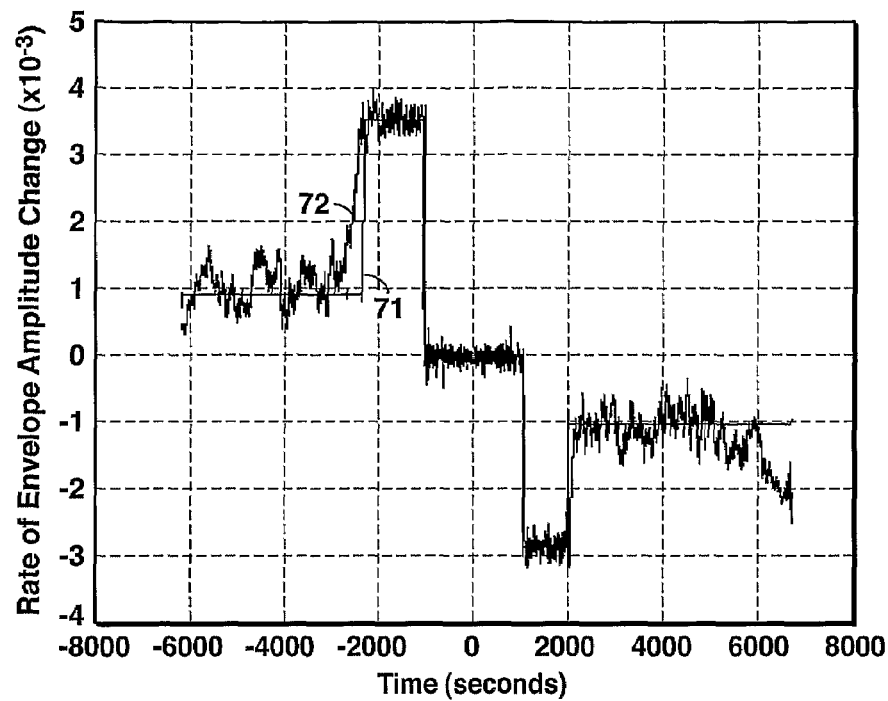

FIG. 7 shows the amplitude rate of change ΔA of the noise-free signal (solid line 71) and the estimated value of ΔA (jagged line 72) obtained by the Kalman filter using the noisy data. It may be noted that the quality of this estimate is best in the central portions of the data where the signal strength is largest.

Figure 8:
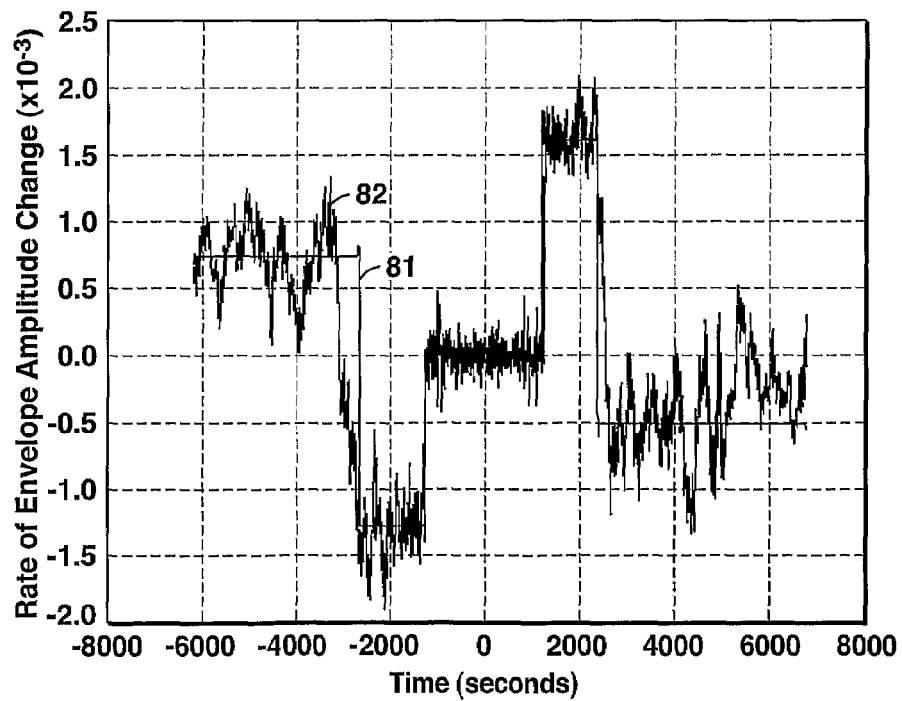

FIG. 8 shows the rate of relative phase change v of the noise-free signal (solid line 81) and the estimated value of v (jagged line 82) obtained by the Kalman filter using the noisy data. Again, the quality of this estimate is best in the central portions of the data where the signal strength is largest.

Figure 9:
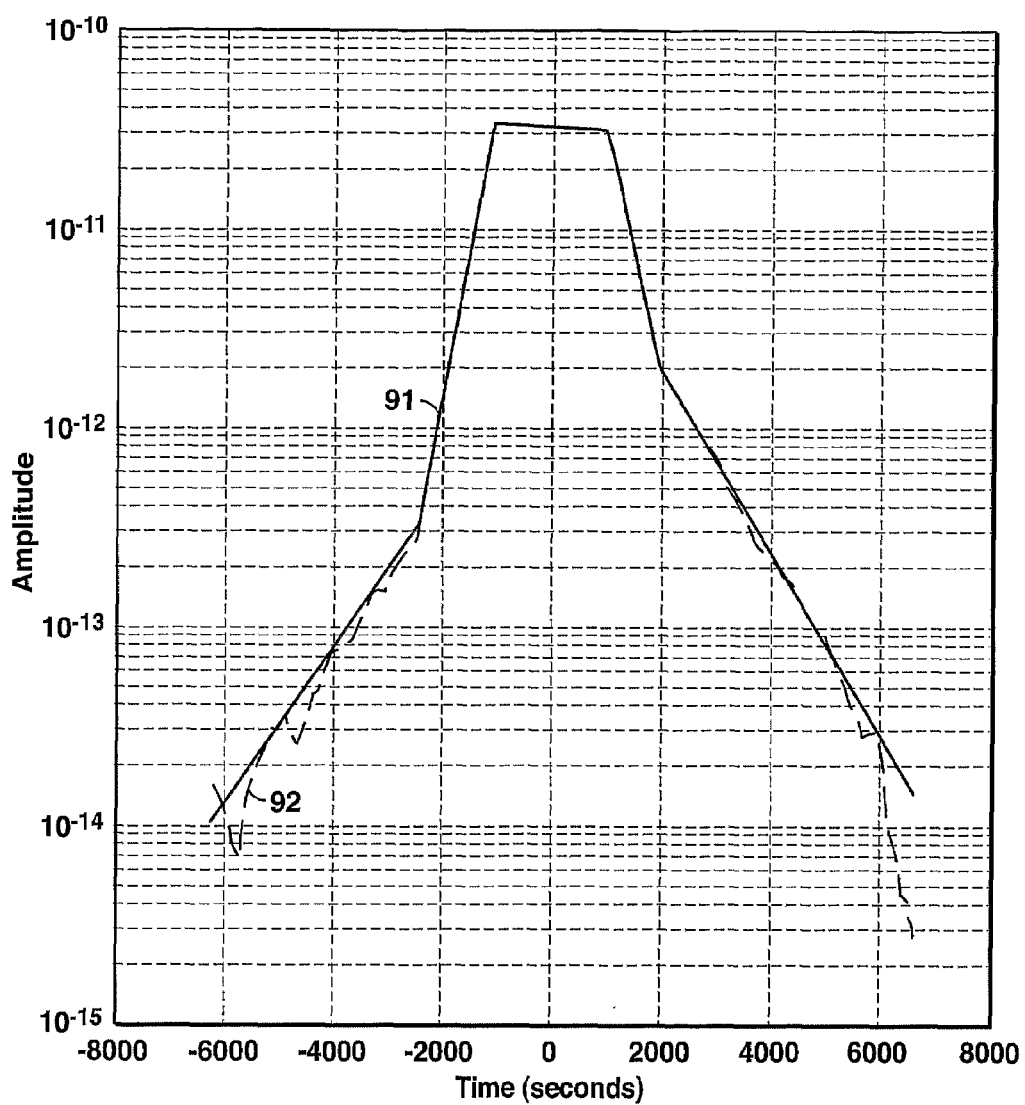
Figure 10:
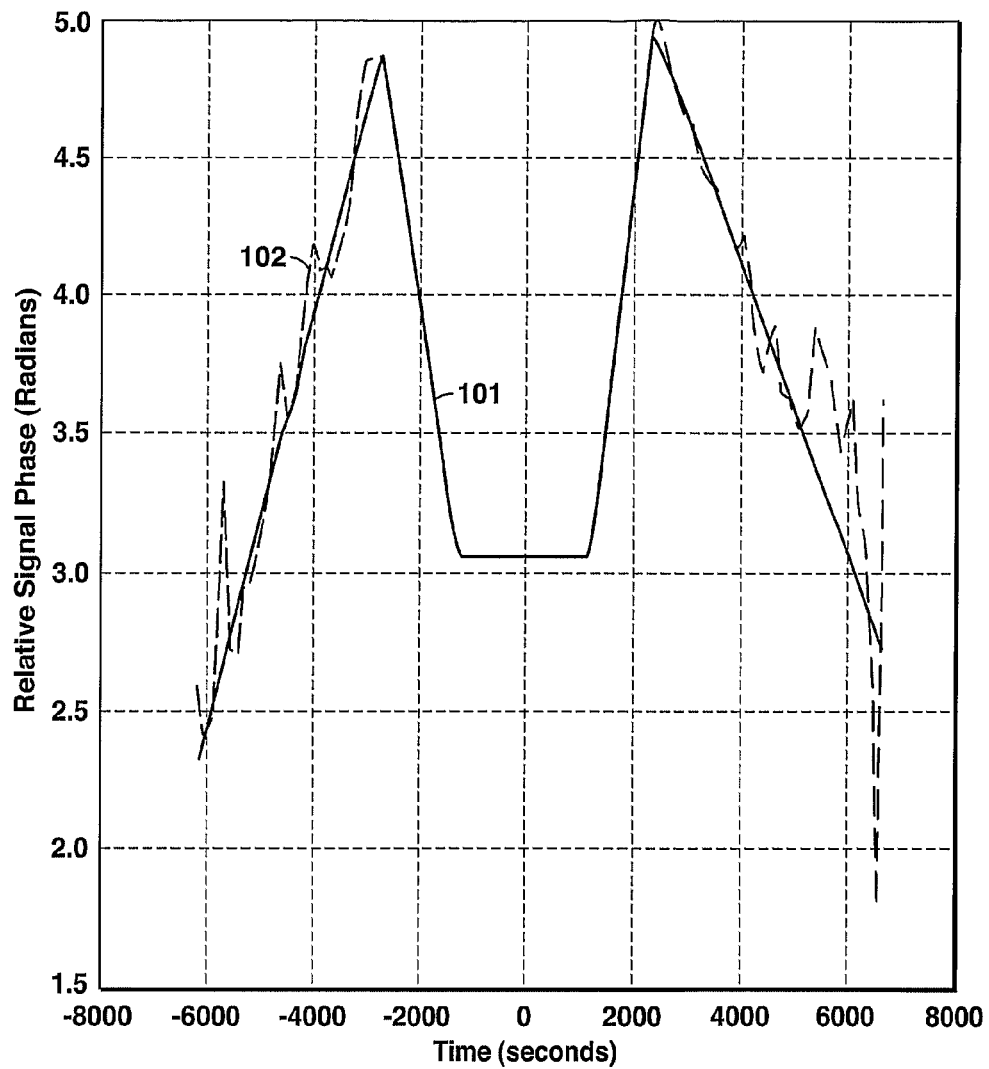

FIG. 9 illustrates the signal amplitude of the noise-free input data (solid curve 91) compared with the Kalman estimate (dashed curve 92). The semilog plot shows the more than three orders of magnitude change in the signal strength. FIG. 10 shows a similar relative phase comparison of input signal 101 versus Kalman estimate 102.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

We claim:

1. A method for tracking amplitude variations and phase changes of a transmitted periodic electromagnetic signal in noisy data detected over time by at least one receiver, said signal being transmitted at a known frequency, said method comprising the steps of:
   (a) selecting a tracking algorithm for tracking a signal of known frequency;
   (b) estimating initial values for the detected signal and at least one related parameter;
   (c) partitioning the detection time into intervals within each of which the detected signal and the at least one related parameter are assumed not to vary and assigning the estimated initial values to the first time interval;
   (d) estimating projection of the initial signal and each related parameter one interval ahead in time;
   (e) revising the initial estimates of step (d) using the data and the tracking algorithm;
   (f) repeating steps (d)-(e) until all data are processed.

2. The method of claim 1, further comprising an initial data scaling step.

3. The method of claim 1, wherein the transmitted signal is a Fourier component of a source signal in an electromagnetic survey of a subsurface formation.

4. The method of claim 3, comprising a final step of determining the subsurface formation's resistivity structure from the estimates of the signal or the at least one related parameters.

5. The method of claim 1, wherein the tracking algorithm is a Kalman algorithm involving a state vector specified by a state equation and a measurement equation, said state vector having at least the following two components: the detected signal's amplitude and said at least one selected related parameter.

6. The method of claim 5, wherein the state vector has two components and said at least one related parameter is proportional to the time derivative of the signal (the quadrature signal).

7. The method of claim 5, wherein the Kalman algorithm is adapted to use data detected later in time in the revising step.

8. The method of claim 5, wherein a small correction linearization is implemented in the state equation.

9. The method of claim 5, wherein an estimate of the signal and its associated error is obtained for every time interval.

10. The method of claim 5, wherein the state vector has four components: the signal's amplitude; the quadrature signal amplitude; the time rate of change of the signal's envelope amplitude; and the time rate of change of the signal's relative phase, said latter two components being used to track a signal experiencing substantial attenuation.

11. The method of claim 10, wherein the Kalman algorithm is modified to allow the addition of $\Delta A$ (the time rate of change of the signal's envelope amplitude), and v (the time rate of change of the signal's relative phase) to the state vector, by using a small correction linearization assumption, said linearization assumption comprising: (i) the amplitude of the signal envelope is assumed to be multiplied by $(1\ T\cdot\Delta A)$ where $\Delta A$ is the time rate of change of the signal envelope's amplitude and T is the interval time, and (ii) the signal is assumed to undergo a phase shift of vT where v is the rate of change of the signal's relative phase, and vT is assumed to be $\ll 1$.

12. A method for producing hydrocarbons from a subsurface region, comprising:
   (i) performing a controlled-source electromagnetic survey of the subsurface region;
   (ii) obtaining results of the survey wherein signal is retrieved from background noise in data recorded by a detector by a method comprising:
      (a) selecting a tracking algorithm for tracking a signal of known frequency;
      (b) estimating initial values for the detected signal and at least one related parameter;
      (c) partitioning the detection time into intervals within each of which the detected signal and the at least one related parameter are assumed not to vary and assigning the estimated initial values to the first time interval;
      (d) estimating projection of the initial signal and each related parameter one interval ahead in time;
      (e) revising the initial estimates of step (d) using the data and the tracking algorithm;
      (f) repeating steps (d)-(e) until all data are processed.
   (iii) drilling a well into a layer in the subsurface region identified as a possible hydrocarbon reservoir from resistivity determinations based on the detected electromagnetic signal; and
   (iv) producing hydrocarbons from the well.

* * * * *